3,336,276
NOVEL SYNTHETIC POLYMERS

Chung Sul Kim, West Sacramento, Calif., and Linda M. Wick, Warrensville Heights, Ohio, assignors to The Standard Oil Company, Cleveland, Ohio, a corporation of Ohio
No Drawing. Filed Feb. 21, 1966, Ser. No. 528,787
10 Claims. (Cl. 260—80.73)

This is a continuation-in-part application of our co-pending U.S. patent application Ser. No. 273,855, filed Apr. 18, 1963, now abandoned.

The present invention relates to novel interpolymers of an alpha, beta-olefinically unsaturated nitrile, a lower alkyl ester of acrylic acid and an N-hydrocarbon substituted amide of an alpha, beta-olefinically unsaturated carboxylic acid.

It is recognized in the art that copolymers of acrylonitrile with acrylate esters possess high flexural and impact strengths, but their thermal behavior is poor as evidenced by relatively low heat distortion temperatures. It has also been recognized that copolymers of acrylonitrile with acrylamides have good thermal properties as evidenced by relatively good heat distortion temperatures, but they generally have very poor strength properties and they are inclined to be brittle. There has been no previous disclosure that interpolymers of the particular monomeric components embodied herein would possess both thermal and strength properties which are in a range which is highly desirable for good molding resins.

We have discovered novel resinous interpolymers of from 25 to 75% by weight of (1) a nitrile monomer having the structure

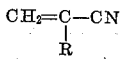

from 15 to 50% by weight of (2) an acrylic ester having the structure $CH_2=CH-COOR_1$ and from 15 to 50% by weight of (3) an amide monomer having the structure

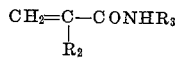

wherein R and $R_2$ are each selected from the group consisting of hydrogen, a halogen and an alkyl radical having from 1 to 4 carbon atoms; $R_1$ is an alkyl group having from 1 to 6 carbon atoms; and $R_3$ is a hydrocarbon group having from 1 to 10 carbon atoms. It is to be understood that the sum of the weight percentages of (1)+(2)+(3) monomer components will always be 100.

The nitrile monomers which are preferred in the present invention are those having the structure

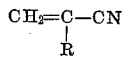

wherein R is a member selected from the group consisting of hydrogen, chlorine, and a methyl radical. Representative specific compounds include acrylonitrile, alpha-chloroacrylonitrile and methacrylonitrile. Most preferred in the present invention is acrylonitrile.

The acrylic esters which are preferred in the present invention are those having the structure

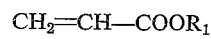

wherein $R_1$ is an alkyl group having from 1 to 4 carbon atoms such as methyl acrylate, ethyl acrylate, the propyl acrylates, and the butyl acrylates. The most preferred acrylate esters in the present invention are methyl acrylate and ethyl acrylate.

The amide monomers preferred in the present invention are those having the structure

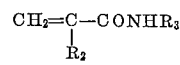

whrein $R_2$ is hydrogen and $R_3$ is a hydrocarbon radical having from 4 to 10 carbon atoms and preferably a bulky hydrocarbon group such as N-t-butyl acrylamide, N-t-hexyl acrylamide, N-t-octyl acrylamide, N-phenyl acrylamide. Most preferred are N-t-butyl acrylamide, N-t-octyl acrylamide and N-t-hexyl acrylamide.

One advantage of the present invention lies in the unexpected fact that the terpolymer resins of this invention possess excellent thermal and strength properties, although the copolymers of acrylonitrile and acrylate esters or acrylonitrile and N-substituted acrylamides do not possess adequate properties. Another important advantage lies in the fact that the terpolymer resins embodied herein are clear and transparent when molded at about 150° C. and 4000 p.s.i. Viewed in a slightly different manner, it is unexpected that the substitution of an N-hydrocarbon substituted acrylamide for a portion of the acrylate ester in an acrylonitrile-acrylate ester copolymer not only raises the heat distortion temperature by a large amount without any significant depreciation of the strength properties, but in some cases the physical strength of the interpolymer is actually improved.

A significant practical advantage evidenced by the composition of this invention may be emphasized by a brief exposition of the economic factors involved. The clear, transparent molding resins of the present invention can be produced at very moderate expense both for materials and processing. Additionally, both acrylonitrile and the appropriate acrylates are readily available commercially. The N-substituted acrylamides are readily produced from relatively inexpensive starting materials. Thus, the addition of sulfuric acid to a solution of acrylonitrile, the desired olefin, and acetic acid at a temperature of about 40° C. produces the solid N-substituted acrylamide which may be washed out and dried and is ready for use without any further purification.

A further economic advantage is that the olefins used as raw materials for the production of the N-substituted acrylamides do not have to be highly purified, so that cheaper impure hydrocarbon streams may be utilized. Thus, in the case of the N-tertiary alkyl acrylamides, which may be prepared cheaply from acrylonitrile and iso-olefins using sulfuric acid as a catalyst, both 1-olefins and 2-olefins give the same acidic complex intermediate and hence, yield the same N-substituted acrylamide. Accordingly, both technical and economic advantages can be shown for the specific terpolymeric resins of this invention.

The terpolymers embodied herein may be prepared by mass or bulk, solution, suspension or emulsion polymerization techniques. It is proposed to prepare the terpolymers by emulsion or suspension techniques in an aqueous medium. The aqueous medium may contain any suitable emulsifying agent such as the organic alkali metal sulfates, and sulfonates, and sulfonates of the higher fatty esters, amides, and ethers of compounds bearing sulfate and sulfonic groups; aromatic and alkylated aromatic sulfonates; metal salts of aromatic and aliphatic phosphates; and the like. There also may be employed the fatty acid alkali metal soaps; cationic surface active agents such as the fatty amines and amido-amines; and non-ionic surface active agents such as the condensed glycols and polyvinyl alcohol. The aqueous media may contain upwards of about 0.5% and preferably 1% to 5% of the emulsifying agents, depending on the effectiveness of the specific emulsifying agents employed, and also upon the desired state of the final product.

In general, a sufficient amount of the aqueous emulsifying medium is employed to provide a conveniently workable polymerization mass, this quantity being upwards of 75% by weight and preferably about 100%, based on the weight of monomers. Two hundred percent or more may be employed but will usually be found unnecessary and wasteful of space in the reaction equipment.

Any of the usual polymerization initiators may be incorporated into the polymerization mixture to promote the reaction, such initiators being exemplified by hydrogen peroxide, per-salts, such as potassium, sodium and ammonium persulfate, sodium perborate, organic acid peroxides, such as benzoyl peroxide and peracetic acid, and other similar compounds. The so-called redox catalysts and those disclosed in U.S. Patents Nos. 2,471,959 and 2,491,471 may be used in the preparation of the polymers of this invention. The amount of catalyst used may vary from about 0.1 to 5% based on the weight of the monomers, the greater quantities resulting in higher yields in any given time, at the expense of some reduction in average molecular weight of the product.

The interpolymerizations of this invention may be carried out at temperatures ranging from 30° C. or lower to 80° C. or higher. At the lower temperatures, the reaction proceeds slowly, with formation of higher molecular weight polymers and conversely, at higher temperatures the reaction proceeds rapidly with formation of polymers of somewhat lower molecular weight. A good balance between economy of operation and quality of product will be found in the preferred range of from about 40° C. to 70° C. Under these conditions, the reaction will proceed substantially to its maximum conversion (70–100%).

The polymerization process of this invention may be carried out in various types of apparatus. The polymerization may be carried out at atmospheric, subatmospheric or superatmospheric pressures. It is also preferred that the polymerization reaction be carried out in the substantial absence of molecular oxygen.

The compositions and process of this invention are further illustrated in the following illustrative examples wherein the amounts of ingredients are expressed as parts by weight unless otherwise indicated.

*Example I*

A polymer emulsion was prepared from the following ingredients:

| | Parts by weight |
|---|---|
| Acrylonitrile | Variable |
| Methyl acrylate | Variable |
| N-t-butyl acrylamide | Variable |
| Water | 110 |
| Emulsifier (GAFAC RE 610) [1] | 0.75 |
| t-Dodecyl mercaptan | 0.187 |
| Potassium persulfate | 0.135 |
| Sodium metabisulfate | 0.06 |

[1] Other emulsifiers such as sodium lauryl sulfate may be used here. GAFAC RE 610 is a mixture of

and $[R\text{—}O(CH_2CH_2O\text{—})_n]_2PO_2M$ wherein $n$ is a number of from 1 to 40; R is an alkyl or alkaryl group and preferably a nonyl phenyl group and M is hydrogen, ammonia or an alkali metal which composition is marketed by the General Aniline and Film Corp.

The pH of the system was adjusted to 5.0 with a potassium hydroxide solution. The polymerization vessel was swept with nitrogen and the reaction was carried out at 60° C. with constant stirring for 16 hours. The polymer was isolated by dilute sulfuric acid coagulation followed by filtration and washing. The yields and physical properties of the dried polymers prepared in this manner are shown in Table I.

The third polymer in Table I, which is the only one having a composition which is within the scope of the present invention, formed a transparent, clear bar when molded at about 150° C. and 4000 p.s.i.

An interpolymer outside the scope of the present invention representing the upper limit of acrylamide disclosed in German Patent No. 900,752 was prepared as described above employing the following recipe:

| | Parts by weight |
|---|---|
| Acrylamide | 15.0 |
| Acrylonitrile | 59.5 |
| Methyl methacrylate | 25.5 |
| GAFAC RE 610 | 1.5 |
| Water | 208.0 |
| t-Dodecyl mercaptan | 0.25 |
| Potassium persulfate | 0.27 |

The polymerization was carried out with agitation under nitrogen at 60° C. for 16 hours. A stable latex was not obtained. The product consisted of a large, hard lump which is not an unexpected result where so much water soluble monomer (acrylamide) is used. The solid was broken up, washed in water and in 50 volume percent water-methanol, dried and then was compression molded at 150° C. and 4000 p.s.i. The molded bars were quite opaque and very brittle making it difficult to remove them from the mold without breaking them. The polymer seemed to be a heterogeneous material which broke in the flexural test. The molded bars of the polymer did not resemble the clear, tough polymers of the instant invention.

TABLE I.—EMULSION POLYMERIZATION

| Monomer Ratio | | | Temp., °C. | Polymer Yield, Percent | ASTM Heat Distortion Temp., °C. | Flexural Strength, p.s.i. | Shore D Hardness |
|---|---|---|---|---|---|---|---|
| Acrylonitrile | Methyl Acrylate | N-t-Butyl Acrylamide | | | | | |
| 78 | 0 | 22 | 40 | 66 | 113 | 7,300 | 83 |
| 70 | 30 | 0 | 60 | -------- | 60 | 21,000 | -------- |
| 70 | 15 | 15 | 60 | 94 | 80 | 19,600 | 90 |

Example II

The procedure of Example I was repeated except that part of the water was replaced with an alcohol. The results of a series of experiments are given in Table II.

The second polymer shown in Table II, which is the only one within the scope of the present invention, formed a clear, transparent bar when it was molded at about 150° C. and 4000 p.s.i.

TABLE II.—POLYMERIZATION IN SOLVENT SYSTEM

| Monomer Ratio | | | Polymerization Solvent | Temp., ° C. | Percent Yield | ASTM Heat Distortion Temp., ° C. | Flexural Strength, p.s.i. | Shore Hardness |
|---|---|---|---|---|---|---|---|---|
| Acrylonitrile | Ethyl Acrylate | N-t-Butyl Acrylamide | | | | | | |
| 70 | 30 | 0 | 25% i-prOH | 65 | 45 | 50 | 14,300 | 88 |
| 70 | 15 | 15 | 25% i-prOH | 65 | 92 | 75 | 6,900 | 89 |
| 70 | 30 | 0 | 50% EtOH | 35 | 53 | 60 | 18,700 | 89 |

Example III

The procedures of Example I and II were followed employing the monomers listed in Table III. The pertinent data concerning yield, physical properties and appearance of the molded polymers appear in Table III. In Table III the abbreviation AN means acrylonitrile, N-t-BAA means N-t-butyl acrylamide, N-t-OAA means N-tertiary octyl acrylamide, MA means methyl acrylate, N-t-HAA means N-tertiary hexyl acrylamide, HDT means heat distortion temperature and Flex. Str. means flexural strength. All of the physical properties such as heat distortion temperature, Izod impact strength, modulus and flexural strength were determined by ASTM methods.

A terpolymer which is outside the scope of the present invention was prepared from acrylonitrile, methyl acrylate and acrylamide as disclosed in German Patent No. 900,-752 employing the following recipe:

Parts by weight
Acrylamide _____ 15.0
Acrylonitrile _____ 59.5
Methyl acrylate _____ 25.5
GAFAC RE 610 _____ 1.5
Water _____ 208.0
t-Dodecyl mercaptan _____ 0.25
Potassium persulfate _____ 0.27

The pH of the mixture was about 6. The polymerization was carried out under nitrogen for 16 hours at 60° C. A stable latex was not obtained. The product consisted of a large white, solid lump. The lump was broken up, washed in water and 50% by volume water-methanol and was dried giving a 91% yield of polymer. Samples of the dried polymer were compression molded at 4000 p.s.i. and at temperatures of 150° C. and 180° C. The molded bars were translucent but not transparent like the polymers embodied in the instant invention.

We claim:

1. The resinous interpolymer possessing excellent thermal and strength properties which is transparent when molded at about 150° C. and 4000 p.s.i. prepared by polymerizing in an aqueous medium in the presence of an emulsifying agent and a polymerization initiator at a temperature of from about 30° C. to 80° C. in the substantial absence of oxygen, a monomer mixture of 25 to 75% by weight of (1) a nitrile monomer selected from the group consisting of acrylonitrile, alpha-chloroacrylonitrile and methacrylonitrile, from 15 to 50% by weight of (2) an acrylic ester selected from the group consisting of methyl acrylate, ethyl acrylate, propyl acrylates and butyl acrylates, and from 15 to 50% by weight of (3) an amide monomer selected from the group consisting of N-t-butyl acrylamide, N-t-hexyl acrylamide and N-t-octyl acrylamide.

2. The interpolymer of claim 1 wherein (1) is acrylonitrile, (2) is ethyl acrylate and (3) is N-t-butyl acrylamide.

3. The interpolymer of claim 1 wherein (1) is acrylonitrile, (2) is methyl acrylate and (3) is N-t-butyl acrylamide.

4. The interpolymer of claim 1 wherein (1) is acrylonitrile, (2) is methyl acrylate and (3) is N-t-octyl acrylamide.

5. The interpolymer of claim 1 wherein (1) is acrylonitrile, (2) is methyl acrylate and (3) is N-t-hexyl acrylamide.

6. The process comprising polymerizing in an aqueous medium a mixture of from 25 to 75% by weight of (1) a nitrile monomer selected from the group consisting of acrylonitrile, alpha-chloroacrylonitrile and methacrylonitrile, from 15 to 50% by weight of (2) an acrylic ester selected from the group consisting of methyl acrylate, ethyl acrylate, propyl acrylates and butyl acrylates, and from 15 to 50% by weight of (3) an amide monomer selected from the group consisting of N-t-butyl acrylamide, N-t-hexyl acrylamide and N-t-octyl acrylamide in the presence of from 0.5 to 5% by weight based on the weight of (1)+(2)+(3) of an emulsifying agent selected from the group consisting of organic alkali metal sulfates and sulfonates, sulfonates of higher fatty esters, amides, ethers of compounds bearing sulfate and sulfonate groups,

TABLE III

| AN | N-Subst. Acrylamide | Other | Percent Yield | Molding Method | HDT (264 p.s.i.), ° C. | Flex. Str., p.s.i. | Observations |
|---|---|---|---|---|---|---|---|
| 60 | 20 (N-t-BAA) | 20 (MA) | 99 | Compression, 150° C., 4,000 p.s.i. | 85 | 18,600 | Transparent. |
| 60 | 20 (N-t-OAA) | 20 (MA) | 96 | ____do____ | 74 | 16,100 | Do. |
| 50 | 30 (N-t-BAA) | 20 (MA) | 95 | ____do____ | 90 | 17,800 | Do. |
| 60 | 20 (N-t-BAA) | 20 (MA) | 95 | Injection, 450° F. | 81 | 20,800 | Notched Izod 1.6 ft.-lb./in.; 1.1 (annealed); Transparent. |
| 40 | 35 (N-t-BAA) | 25 (MA) | 100 | Injection, 425° F. | 76 | 17,900 | Modulus 5.6; Notched Izod, 0.52; Transparent. |
| 30 | 40 (N-t-HAA) | 30 (MA) | 96 | Injection, 350° F. | 67 | 13,000 | Notched Izod, 0.33; Transparent. | aromatic and alkylated aromatic sulfonates, metal salts of aromatic and aliphatic phosphates, fatty acid alkali metal soaps, fatty amines and amido amines, condensed glycols and polyvinyl alcohol and 0.1 to 5% by weight based on the weight of (1)+(2)+(3) of a polymerization initiator selected from the group consisting of hydrogen peroxide, potassium persulfate, sodium persulfate, ammonium persulfate, sodium perborate, organic acid peroxides and redox catalysts at a temperature of from about 30° C. to 80° C. in the substantial absence of oxygen.

7. The process of claim 6 wherein (1) is acrylonitrile, (2) is methyl acrylate and (3) is N-t-butyl acrylamide.

8. The process of claim 6 wherein (1) is acrylonitrile, (2) is ethyl acrylate and (3) is N-t-butyl acrylamide.

9. The process of claim 6 wherein (1) is acrylonitrile, (2) is methyl acrylate and (3) is N-t-hexyl acrylamide.

10. The process of claim 6 wherein (1) is acrylonitrile, (2) is methyl acrylate and (3) is N-t-octyl acrylamide.

References Cited

UNITED STATES PATENTS

| | | | |
|---|---|---|---|
| 2,763,572 | 9/1956 | Staehle | 260—80.5 |
| 2,934,524 | 4/1960 | Phelps et al. | 260—80.5 |
| 3,062,790 | 11/1962 | Schramm et al. | 260—80.5 |

FOREIGN PATENTS 900,752  1/1954  Germany.

JOSEPH L. SCHOFER, *Primary Examiner.*

W. HOOVER, J. A. SEIDLECK, *Assistant Examiners.*